United States Patent
Chen

(10) Patent No.: US 8,911,075 B2
(45) Date of Patent: Dec. 16, 2014

(54) EYEGLASSES

(76) Inventor: Lin-Yun Chen, Tainan (TW)

(*) Notice: Subject to any disclaimer, the term of this patent is extended or adjusted under 35 U.S.C. 154(b) by 174 days.

(21) Appl. No.: 13/551,666

(22) Filed: Jul. 18, 2012

(65) Prior Publication Data

US 2013/0271721 A1    Oct. 17, 2013

(30) Foreign Application Priority Data

Apr. 16, 2012  (TW) .............................. 101206958 A

(51) Int. Cl.
*G02C 1/08*    (2006.01)
*G02C 5/14*    (2006.01)

(52) U.S. Cl.
CPC    *G02C 1/08* (2013.01); *G02C 5/146* (2013.01); *G02C 2200/04* (2013.01)
USPC .............................. 351/90; 351/121; 351/140

(58) Field of Classification Search
CPC ............ G02C 5/14; G02C 5/146; G02C 1/08; G02C 2200/04; G02C 2200/06; G02C 2200/08
USPC ......... 351/90, 95, 97, 99–102, 111, 121, 153, 351/119, 140; 16/228
See application file for complete search history.

(56) References Cited

U.S. PATENT DOCUMENTS

| 6,834,952 B2* | 12/2004 | Polovin .......................... 351/116 |
| 7,137,700 B2* | 11/2006 | DiChiara et al. ................. 351/90 |
| 2006/0119789 A1* | 6/2006 | Bruck .............................. 351/92 |

* cited by examiner

*Primary Examiner* — Huy K Mai
(74) *Attorney, Agent, or Firm* — Alan Kamrath; Kamrath IP Lawfirm, P.A.

(57) ABSTRACT

A pair of eyeglasses includes a frame and two temples. The frame includes two rims whose inner edges are connected with each other. An inner wall of each of the rims has a slot in which the lens is inserted. An outer edge of each rim has a first connecting end and a second connecting end capable of connecting with or being separate from each other. Outer edges of the first and second connecting ends of each rim are respectively configured with connecting portions. A front end of each temple has a connecting recess for containing the two connecting portions of one of the rims to connect the first and second connecting ends of the rim. With the frame structure, the slot of the rim can be allowed greater depth, so that the lenses can be more firmly fixed to the rims respectively.

5 Claims, 6 Drawing Sheets

EYEGLASSES

BACKGROUND OF THE INVENTION

1. Field of the Invention

The invention relates to a pair of eyeglasses and, in particular, to a pair of eyeglasses with the lens thereof firmly fixed to the frame and the temple replaceable with different ones.

2. Description of the Prior Art

In general, a pair of eyeglasses includes a frame, two lenses, and two temples. The frame is usually made of plastic material and integrally formed as one piece including two rims connected with each other. Inner walls of the rims are respectively configured with slots for containing the lenses. However, the frame of the conventional eyeglasses has a serious problem. When the eyeglasses are subjected to an external collision, the lenses thereof are very easy to be separated from the frame and thus damaged. In detail, in order to easily press the lens into the slot of the rim of the frame, the slot can not be over deep. However, in this case, the lens will be easily separated from the frame when subjected to an external collision due to the insufficient depth of the rim's slot.

SUMMARY OF THE INVENTION

In view of the foregoing problem, an objective of the invention is to provide a pair of eyeglasses that includes a frame with rims for fixing the lenses more firmly so that the lenses are not easy to be separated from the frame. Besides, the temple of the eyeglasses of the invention can be replaced with different ones.

A pair of eyeglasses of the invention comprises a frame and two temples. The frame includes two rims whose inner edges are connected with each other. Each of the rims has a space for containing a lens. An inner wall of each of the rims has a slot in which the lens is inserted. An outer edge of each of the rims has a first connecting end and a second connecting end capable of connecting with or being separate from each other. Outer edges of the first and second connecting ends of each of the rims are respectively configured with connecting portions. A front end of each of the temples has a connecting recess for containing the two connecting portions of one of the rims to connect the first and second connecting ends of the rim.

In one embodiment, the two connecting portions of the first and second connecting ends of each of the rims have connecting holes respectively. When the first and second connecting ends of each of the rims are connected with each other, the two connecting portions of the first and second connecting ends are disposed adjacent to each other, and the connecting holes of the two connecting portions are aligned. The front end of each of the temples has a connecting hole connecting with the connecting recess. A fixing element passes through the connecting hole of the temple and the connecting holes of the two connecting portions to connect the first and second connecting ends of the rim. The first and second connecting ends of each of the rims have opposite edge surfaces respectively. The edge surfaces are configured with a protrusion and a recess complementary to each other. The protrusion and the recess are connected firmly when the first and second connecting ends of each of the rims are connected with each other.

DETAILED DESCRIPTION OF THE INVENTION

Figure 1:
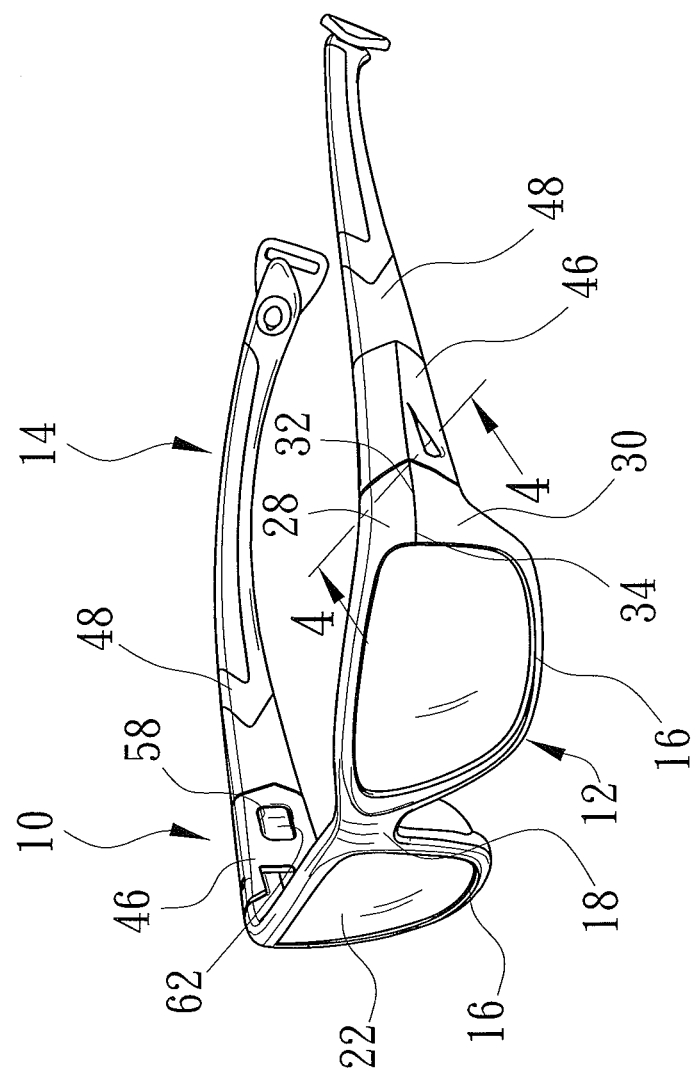
FIG. 1 is a schematic diagram of a pair of eyeglasses of an embodiment of the invention.
Figure 2:
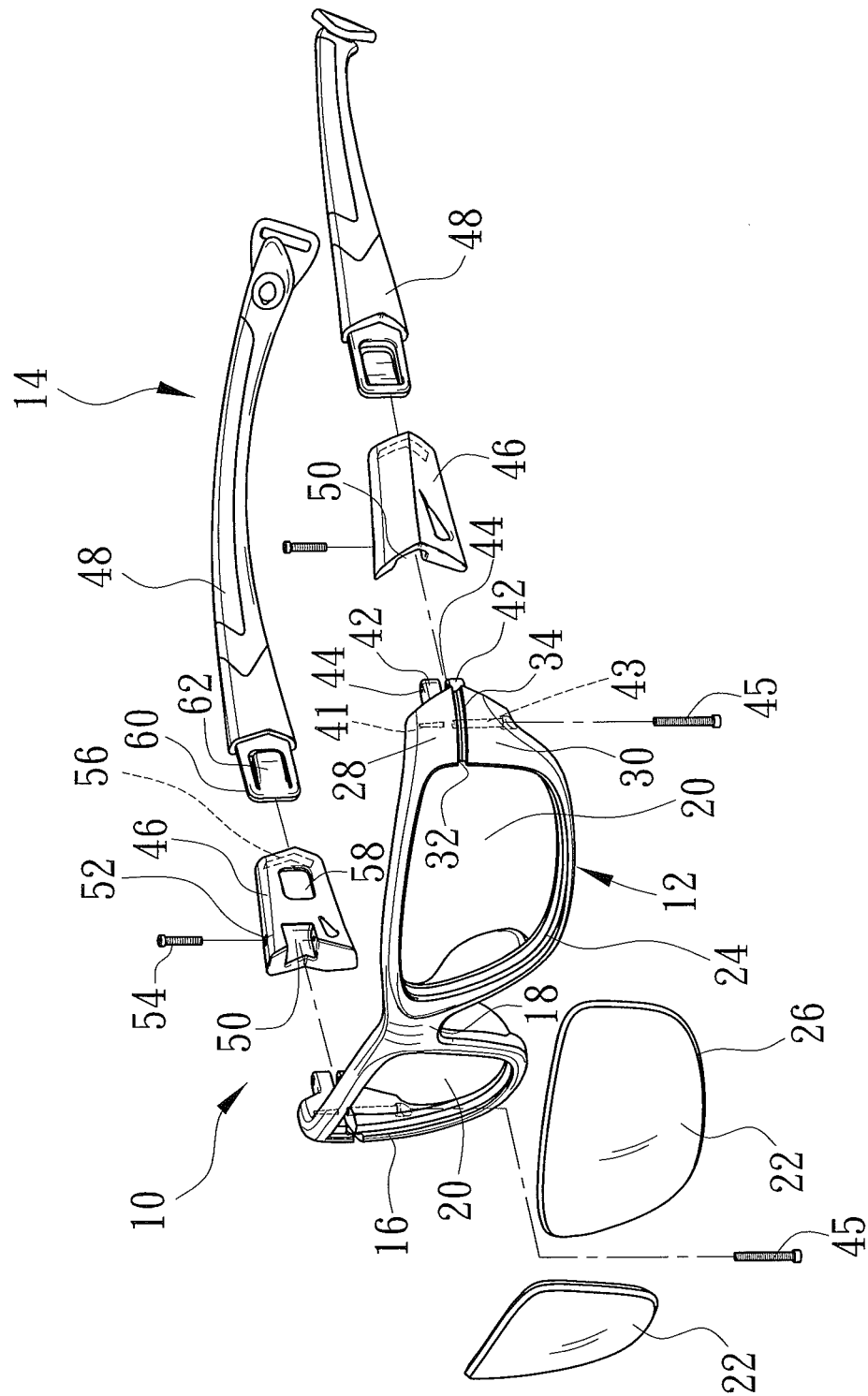
FIG. 2 is an exploded diagram of the eyeglasses as shown in FIG. 1.
Figure 3:
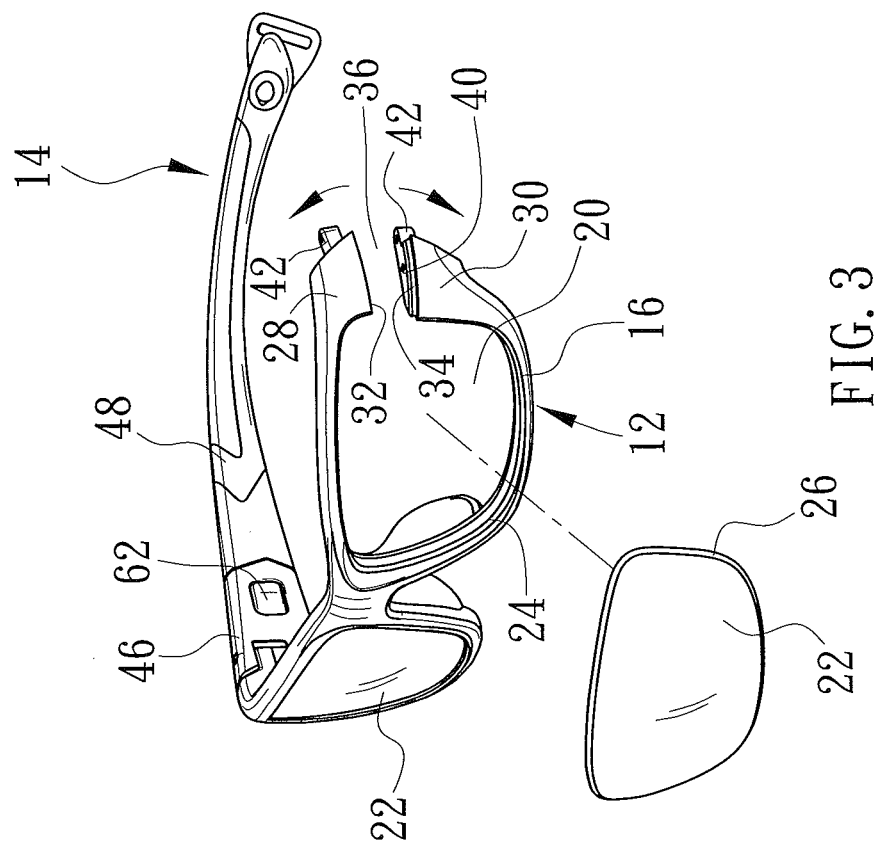
FIG. 3 is a schematic diagram showing the separation of an outer edge of a rim of the eyeglasses as shown in FIG. 1.
Figure 4:
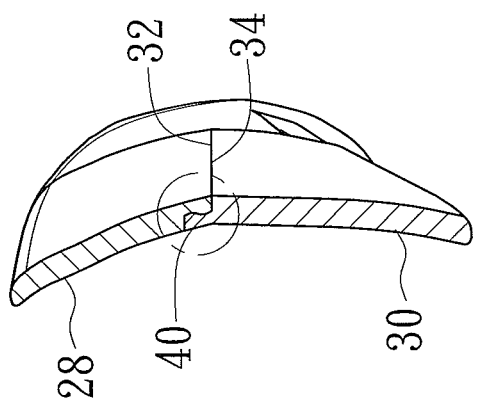
FIGS. 4 and 4a are respectively a cross-sectional diagram and a partial enlarged diagram taken along the line 4-4 in FIG. 1.
Figure 4A:
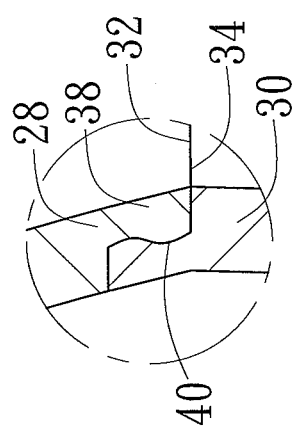

As shown in FIGS. 1 to 4, a pair of eyeglasses 10 of a preferred embodiment of the invention includes a frame 12 and two temples 14 detachably connected with the frame 12. The frame 12 is made of plastic material and integrally formed as one piece including two separate rims 16. In other embodiments, the frame 12 can be made of other material, such as metal or an alloy. The rims 16 are connected together by a bridge portion 18. The rims 16 each have an opening 20 for containing a lens 22. The inner wall of each of the rims 16 has an approximately circular slot 24, into which the edge 26 of the lens 22 can be inserted.

The frame 12 of the embodiment is mainly characterized by the design of the rims 16. In the embodiment, an outer edge of each of the rims 16 includes a first connecting end 28 and a second connecting end 30. The first and second connecting ends 28 and 30 can be connected with or separated from each other. Besides, the first and second connecting ends 28 and 30 have opposite edge surfaces 32 and 34, respectively. When the first connecting end 28 and the second connecting end 30 of each of the rims 16 are separated from each other, a separation space 36 (see FIG. 3) is defined between the edge surfaces 32 and 34 of the first and second connecting ends 28 and 30. When the first and second connecting ends 28 and 30 of each of the rims 16 are connected with each other, the edge surfaces 32 and 34 are connected face to face. Besides, the edge surfaces 32 and 34 are respectively configured with a protrusion 38 and a recess 40 complementary to each other, so that the edge surfaces 32 and 34 can be firmly connected with each other. Besides, outer edges of the first and second connecting ends 28 and 30 of each of the rims 16 are respectively configured with connecting portions 42, each of which is protruded and shaped like a pillar. Each of the connecting portions 42 has a connecting hole 44. When the first and second connecting ends 28 and 30 of each of the rims 16 are connected with each other, the connecting portions 42 thereof are disposed adjacent to each other, and, also, the connecting holes 44 of the connecting portions 42 face each other. Furthermore, in the embodiment, two aligned fixing holes 41 and 43 are respectively disposed in the first and second connecting ends 28 and 30. A fixing element 45, such as a screw, passes through the fixing hole 43 of the second connecting end 30 from the bottom surface of the second connecting end 30, and then is fixed into the fixing hole 41 of the first connecting end 28, so that the first and second connecting ends 28 and 30 of each of the rims 16 can be more firmly connected with each other. Thereby, the frame 12 can be prevented from being broken when subjected to an external collision.

In the embodiment, each of the temples 14 includes a connecting element 46 and a temple element 48. A front end of each of the connecting elements 46 has a connecting recess 50. A width of the connecting recess 50 is almost equivalent to the width of the two adjacent connecting portions 42, so that the connecting recess 50 of the connecting element 46 can accommodate the two connecting portions 42 of the corresponding rim 16, whereby the connecting portions 42 are disposed adjacent to each other. Besides, the front end of each of the connecting elements 46 has a connecting hole 52 connecting with the connecting recess 50. For connecting the connecting recess 50 of each of the connecting elements 46 and the two connecting portions 42 of the rim 16, a fixing element 54, such as a screw, passes through the connecting hole 52 of the connecting element 46 and the connecting holes 44 of the two connecting portions 42. Accordingly, the first and second connecting ends 28 and 30 of the rim 16 are firmly connected with each other, and the connecting element 46 and the rim 16 are pivoted together, so that the temple 14 can be rotated relative to the frame 12 and thus be folded. Besides, a rear end of each of the connecting elements 46 has a through hole 56 and a connecting recess 58, and a front end of each of the temple elements 48 has an elastic sheet 62. The front end 60 of each of the temple elements 48 is inserted into the through hole 56 of the corresponding connecting element 46, so that the elastic sheet 62 can be connected with the connecting recess 58. Besides, the elastic sheet 62 can be separated from the connecting recess 58 by pressing the elastic sheet 62, also separating the temple element 48 from the connecting element 46. Therefore, the temple 14 can be replaced with different ones.

Figure 5:
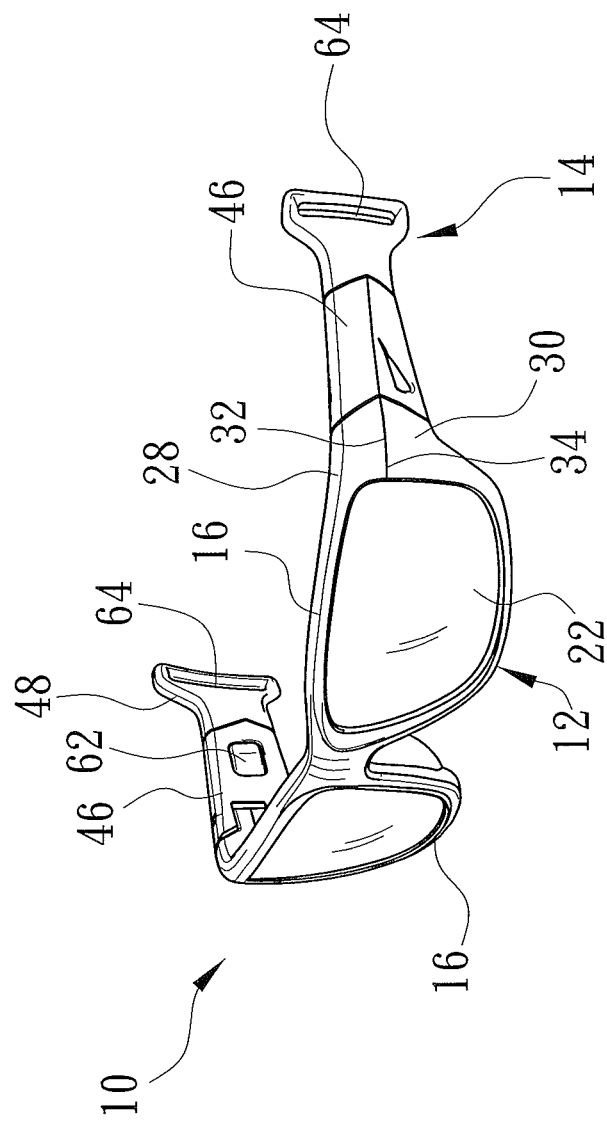
FIG. 5 is a schematic diagram of a pair of eyeglasses of another embodiment of the invention.
Figure 6:
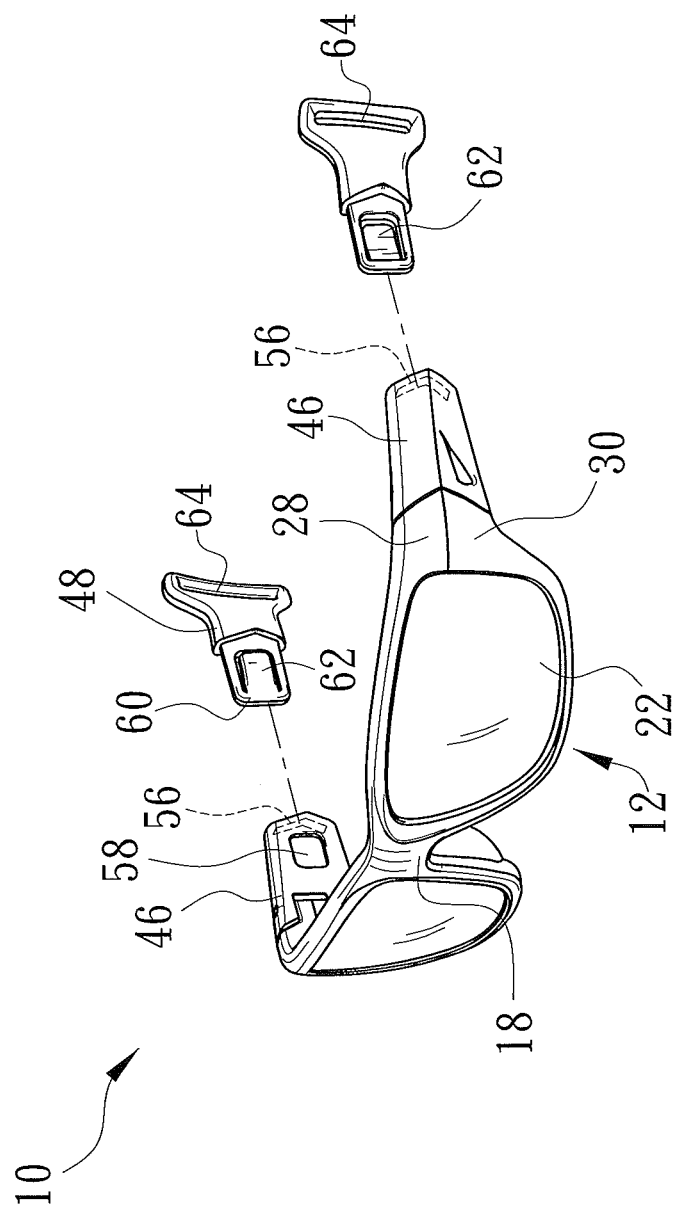
FIG. 6 is an exploded diagram of the eyeglasses as shown in FIG. 5.

FIGS. 5 and 6 are schematic diagrams of a temple 14 of another embodiment of the invention. A rear end of a temple element 48 of the temple 14 has a through hole 64 for allowing an elastic band or a string (not shown) to pass through. In other embodiments, the connecting element 46 and the temple element 48 can be integrally formed as one piece.

In summary, according to the eyeglasses 10 of the invention, the slot 24 of the rim 16 of the frame 12 can have a sufficient depth for firmly fixing the lens 22, so that the lens 22 will not be separated from the frame 12 when the eyeglasses 10 are subjected to an external collision. In detail, for fitting the lens 22 to the rim 16 of the frame 12, the first connecting end 28 and the second connecting end 30 (see FIG. 3) can be separated from each other first. In this case, even if the circular slot 24 has greater depth, the lens 22 still can be easily fitted to the circular slot 24. Then, when the first and second connecting ends 28 and 30 of the rim 16 are connected with each other, the lens 22 is firmly fixed by the circular slot 24 of the rim 16 (see FIG. 1).

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A pair of eyeglasses comprising:
a frame including two rims whose inner edges are connected with each other, wherein each rim has a space for containing a lens, wherein an inner wall of each of the two rims has a slot into which the lens is inserted, wherein an outer edge of each of the two rims has a first connecting end and a second connecting end capable of connecting with or being separate from each other, and wherein outer edges of the first and second connecting ends of each of the two rims are respectively configured with connecting portions; and
two temples, wherein a front end of each temple has a connecting recess for containing the two connecting portions of one of the two rims to connect the first and second connecting ends of the rim, wherein the two connecting portions of the first and second connecting ends of each of the two rims have connecting holes respectively, with the first and second connecting ends of each of the rims connected with each other, the two connecting portions of the first and second connecting ends are disposed adjacent to each other and the connecting holes of the two connecting portions are aligned; wherein the front end of each of the two temples has a connecting hole connecting with the connecting recess, and wherein a fixing element passes through the connecting hole of the temple and the connecting holes of the two connecting portions to connect the first and second connecting ends of the rim.

2. The eyeglasses as recited in claim 1, wherein the first and second connecting ends of each of the two rims have opposite edge surfaces respectively, wherein the opposite edge surfaces are configured with a protrusion and a recess complementary to each other, and wherein the protrusion and the recess are connected firmly when the first and second connecting ends of each of the two rims are connected with each other.

3. The eyeglasses as recited in claim 2, wherein each of the two temples includes a connecting element and a temple element detachably connected with the connecting element, wherein the connecting recess and the connecting hole of the temple are disposed at a front end of the connecting element, wherein a rear end of the connecting element has a connecting recess, wherein a front end of the temple element has an elastic sheet, and wherein the front end of the temple element is inserted into the rear end of the connecting element and with the elastic sheet inserted into and connected with the connecting recess of the connecting element.

4. The eyeglasses as recited in claim 3, wherein the first and second connecting ends of each of the two rims are configured with aligned fixing holes respectively; wherein a fixing element passes through the fixing hole of the second connecting end and then is fixed into the fixing hole of the first connecting end to connect the first and second connecting ends of each of the two rims.

5. The eyeglasses as recited in claim 2, wherein the first and second connecting ends of each of the two rims are configured with aligned fixing holes respectively; wherein a fixing element passes through the fixing hole of the second connecting end and then is fixed into the fixing hole of the first connecting end to connect the first and second connecting ends of each of the two rims.

* * * * *